United States Patent [19]

Martin et al.

[11] Patent Number: 4,526,197
[45] Date of Patent: Jul. 2, 1985

[54] PNEUMATIC VALVE

[75] Inventors: John C. Martin; Paul Martin, both of Toronto, Canada

[73] Assignee: Diesel Equipment Limited, Toronto, Calif.X

[21] Appl. No.: 569,654

[22] Filed: Jan. 10, 1984

[51] Int. Cl.³ .............................................. F15B 13/04
[52] U.S. Cl. ............................... 137/596.2; 137/636.1;
137/868; 137/871; 91/457
[58] Field of Search .................. 137/454.5, 596, 596.2,
137/614.17, 636.1, 868, 871; 91/433, 457;
251/354

[56] References Cited

U.S. PATENT DOCUMENTS

| 2,753,730 | 7/1956 | Ashton et al. | 137/596.2 X |
| 2,962,297 | 11/1960 | Cislo | 137/627.5 X |
| 2,965,200 | 12/1960 | Pribonic | 137/627.5 X |
| 3,820,757 | 6/1974 | Siebel | 137/596.17 UX |
| 4,099,742 | 7/1978 | Wright | 137/596.2 X |

FOREIGN PATENT DOCUMENTS 664652 6/1963 Canada .............................. 137/596.2

Primary Examiner—Gerald A. Michalsky
Attorney, Agent, or Firm—Fetherstonhaugh & Co.

[57] ABSTRACT

A pneumatic valve which is suitable for use in controlling the operation of a pneumatic drive system such as that used for raising and lowering the body of a dump truck. The valve is opened and closed by a slide member which is mounted in a cylinder fomed in the valve housing. An air inlet passage opens into the cylinder and an air outlet passage and a vent passage open from said cylinder. A first flow control valve in the inlet passage which is operable to close to prevent and open to permit the passage of air from the inlet passage to the cylinder. A second flow control valve in the vent passage which is operable to close to prevent and open to permit the passage of air from said cylinder to the vent passage thereby to vent the outlet passage. The slide member is adapted to locate the first flow control valve in its closed position and the second flow control valve in its open position when in the first position and to locate the first flow control valve in its open position and the second flow control valve in its closed position when in the second position.

7 Claims, 4 Drawing Figures

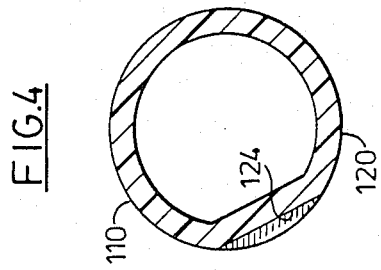
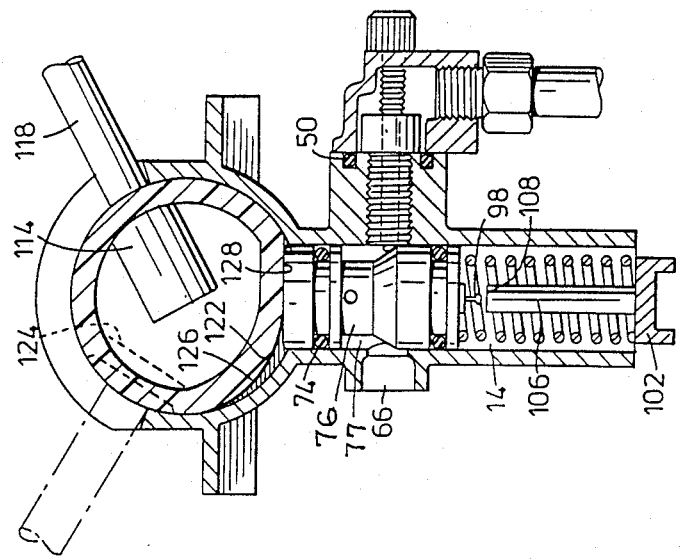
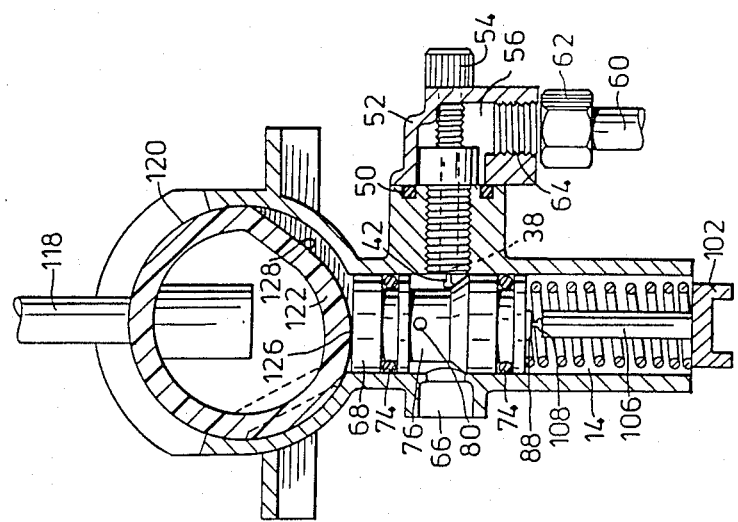

PNEUMATIC VALVE

This invention relates to pneumatic valves. In particular, this invention relates to a pneumatic valve which is suitable for use in controlling the operation of a pneumatic drive system such as that used for raising and lowering the body of a dump truck.

PRIOR ART

Pneumatic valves such as those used for controlling the operation of the hydraulic system of a dump truck or the like have been complex and expensive custom built valve mechanisms. The mechanism provided which permits venting of the downstream side of the valve is complex and costly to manufacture and maintain. The mechanism which meters the supply of air to the hydraulic drive mechanism is also complex and expensive and difficult to maintain.

The present invention provides a pneumatic valve which is substantially less expensive to manufacture and maintain than that previously available.

The pneumatic valve of the present invention employs simple and inexpensive flow control valves of a type commonly used as a valve in a pneumatic tire of a motor vehicle or the like.

It is therefore an object of the present invention to provide a simple and inexpensive pneumatic valve which has a vent which permits venting of the output passage thereof when the input passage is closed and which closes the output passage when the input passage opens.

SUMMARY OF INVENTION

According to one aspect of the present invention, there is provided a pneumatic valve which comprises, a housing, a valve actuator, a first flow control valve, a second flow control valve and a stop for opening the second flow control valve. The housing has a cylinder formed therein. The valve actuator serves to open and close the valve. The valve actuator comprises a slide member slidably mounted in the cylinder for movement in a path which extends longitudinally of the cylinder between a first position and a second position. An air inlet passage opens into the cylinder and an air outlet passage opens from said cylinder. A vent passage opens from said cylinder. The first flow control valve is located in the inlet passage and is operable to close to prevent and open to permit the passage of air from the inlet passage to the cylinder. The second flow control valve is located in the vent passage and is operable to close to prevent and open to permit the passage of air from said cylinder to said vent passage thereby to vent said outlet passage. The slide member is adapted to locate the first flow control valve in its closed position and the second flow control valve in its open position when in said first position and to locate said first flow control valve in its open position and said second flow control valve in its closed position when in said second position. The first and second flow control valves each have a valve stem slidably mounted thereon which is movable between a first position closing and a second position opening said flow control valve, and means normally urging said stem to said first position. The valve stem of the second flow control valve is arranged to project into said cylinder in the direction of movement of said slide member. The stop is supported by said housing in said path of travel of the slide member for arresting movement of the valve stem as said slide member moves toward said first position while permitting continued movement of the slide member to its first position to fully open said second flow control valve as aforesaid.

According to a further aspect of the present invention, there is provided a pneumatic valve which comprises, a housing, a valve actuator, a first flow control valve, a second flow control valve and a stop for opening the second flow control valve. The valve actuator serves to open and close the valve. The valve actuator comprises a slide member slidably mounted in said cylinder for movement, in a path which extends longitudinally of the cylinder, between a first position and a second position. A portion of the length of said slide member has a portion reduced cross-sectional area which cooperates with the cylinder to form an air receiving chamber within said cylinder. An air inlet passage opens through said housing into said air receiving chamber, said inlet passage having an upstream end for communicating with an air pressure source and a downstream end communicating with said cylinder to admit air to said chamber. An air outlet passage opens through said housing from said chamber, said outlet passage having an upstream end communicating with said chamber and a downstream end opening from said housing. The vent passage opens from said chamber through said slide member, said vent passage having an upstream end communicating with said chamber to permit the discharge of air from said chamber and a downstream end opening from said housing. The first one-way check valve is located in said inlet passage, said first one-way check valve having a valve member arranged to check the flow of air from the upstream end to the downstream end of said inlet passage, said valve member being movable in the upstream direction to open to permit the passage of air from the inlet passage to said chamber and being spring loaded for movement in the downstream direction to close to prevent the passage of air from the inlet passage to said chamber. The first check valve has a valve stem projecting from its valve member in said downstream direction, and from the downstream end of said air inlet passage into said chamber. A second one-way check valve in said vent passage, said second one-way check valve having a valve member arranged to check the flow of air from the upstream end to the downstream end of said vent passage, said valve member being movable in the upstream direction to open to permit the venting of air from said chamber and being spring loaded for movement in the downstream direction to close to prevent the venting of air from said chamber. The second check valve has a valve stem projecting from its valve member in said downstream direction, and from the downstream end of said vent passage. The slide member is adapted to locate the first one-way check valve in its closed position and the second one-way check valve in its opeen position when in said first position and to locate said first one-way check valve in its open position and said second one-way check valve in its closed position when in said second position.

The invention will be more clearly understood after reference to the following detailed specification read in conjunction with the drawings wherein:

FIG. 2 is a longitudinal sectional view of the assembled valve of FIG. 1 taken along the line 2—2 of FIG. 1.

FIG. 3 is a longitudinal sectional view similar to FIG. 2 showing the valve in a second position.

Figure 1:
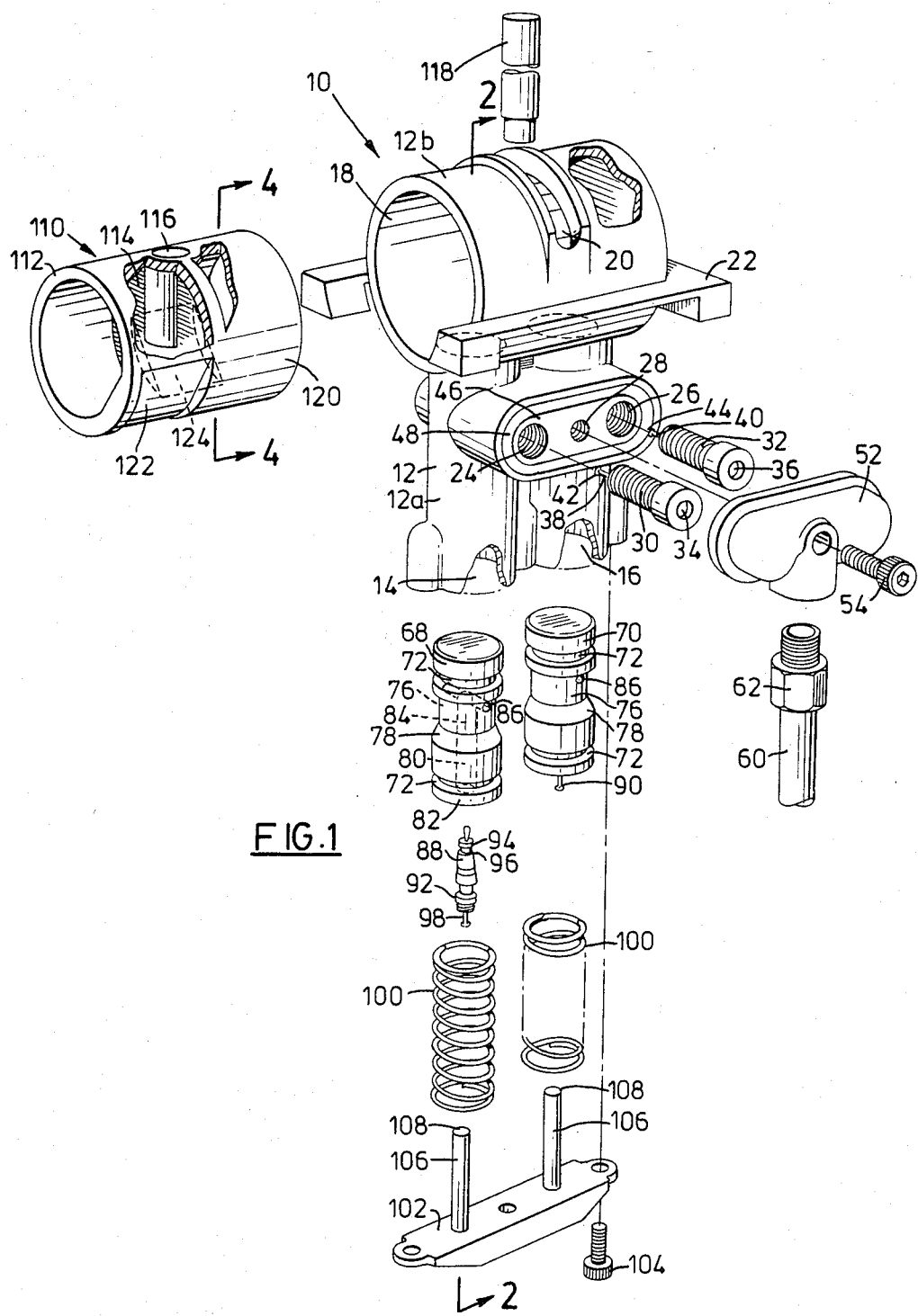
FIG. 1 is a partially sectioned exploded view of a pneumatic valve constructed in accordance with an embodiment of the present invention.

FIG. 4 is a sectional view through the valve actuator of FIG. 1 taken along the line 4—4 of FIG. 1, and With reference to FIG. 1 of the drawings, the reference numeral 10 refers generally to a pneumatic valve constructed in accordance with an embodiment of the present invention for use in controlling the flow of a stream of air. The valve 10 comprises a housing 12 which has a lower body portion 12a in which cylinders 14 and 16 are formed and an upper portion 12b in which a passage 18 is formed. The cylinders 14 and 16 are open at their lower ends and their upper ends open into the passage 18. A slot 20 opens from the passage 18 and extends in an arcuate path through an angle of about 120 degrees. A mounting flange 22 projects laterally from the upper body portion 12b. A pair of air inlet passages 24 and 26 open into the cylinders 14 and 16 respectively. The air inlet passages 24 and 26 each have an upstream end remote from their associated cylinders 14 and 16 and a downstream end opening into the cylinders 14 and 16 respectively. The inlet passages 24 and 26 each have a threaded bore. A threaded passage 28 is formed in the lower body portion 12 and extends inwardly thereof. Valve mounting sleeves 30 and 32 have a threaded body portion adapted to threadedly engage the threaded bores of the air inlet passages 24 and 26 respectively. The sleeves 30 and 32 have through passages 34 and 36. First flow control valves 38 and 40 are threadedly mounted in the through passages 34 and 36 respectively and serve to control the flow of air through these passages. The first flow control valves 38 and 40 are simple and inexpensive one-way check valves of the type commonly known as Schrader valves which are used as a valve in a pneumatic tire. The first control valves 38 and 40 are arranged to check the flow of air from the upstream end to the downstream end of the passages 24 and 26. The Schrader valves are manufactured in large numbers and are very inexpensive and very reliable. The first flow control valves 38 and 40 have valve stems 42 and 44 respectively which project outwardly from the inner ends of the sleeves 30 and 32 in the downstream direction.

The air inlet passages 24 and 26 open outwardly from the body portion 12a at a side face 46. A shallow groove 48 is formed in the side face 46 to receive a sealing ring 50 (FIG. 2). A manifold 52 is secured in a face-to-face relationship with respect to the side face 46 by means of a mounting screw 54 which threadedly engages the threaded passage 28. The manifold 52 has a manifold chamber 56. An air inlet conduit 60 is secured to the manifold by means of a coupling 62 which is threadedly mounted in a threaded passage 64 of the manifold 52. Air outlet passages 66 have an upstream end communicating with the cylinders 14 and 16 and a downstream end opening from the housing 12. The air outlet passages 66 are arranged directly opposite the air inlet passages 24 and 26.

Slide members in the form of pistons 68 and 70 are slidably mounted in cylinders 14 and 16 respectively. The pistons 68 and 70 each have piston ring grooves 72 located adjacent either end thereof within which seals 74 are located which bear against the side walls of the cylinders 14 and 16 to prevent the passage of air between the side wall of the pistons and the side wall of the cylinders. The pistons 68 and 70 each have a portion 76 of reduced diameter and a tapered portion 78 extending downwardly or outwardly therefrom. The portion 76 of reduced diameter cooperates with the cylinder in which it is mounted to form an air receiving chamber 77. A vent passage generally identified by the reference numeral 80 is formed in each piston 68 and 70. The vent passage 80 includes a an upstream portion 86 which extends through the portion 76 of the piston and a a downstream portion 84 which extends longitudinally of the piston from the portion 86 and opens through the lower end face 82 of each piston. The portions 84 of the vent passages 80 are threaded. Second flow control valves 88 and 90 are threadedly mounted in the portions 84 of the vent passages 80 of the pistons 68 and 70 respectively and are arranged to check the flow of air from the upstream end to the downstream end of the passages 80. The second flow control valves 88 and 90 are again of the simple inexpensive one-way check valve of the Schrader type used as flow control valves in pneumatic tires. The second flow control valves 88 and 90 each include a body portion 92 which has a threaded section adapted to threadedly engage the portion 84 as previously described. The second flow control valves 88 and 90 also have a valve member 94 adapted to seal against a valve surface 96. The valve stem 98 is connected to the valve portion 94 such that displacement of the valve stem causes the valve to open. The valves 88 and 90 are normally spring biased to a closed position. An end plate 102 is secured to the lower end of the lower portion 12a of the housing by means of mounting screws 104. The end plate 102 has posts 106 projecting upwardly therefrom which extend into cylinders 14 and 16 respectively. Posts 106 have an upper end face 108 which acts as a stop which arrests the downward movement of the valve stems 98.

A valve actuator is generally identified by the reference numeral 110 and comprises cylindrical body portion 112 within which a boss 114 is formed. A passage 116 opens outwardly from the boss 114 and a manually engageably lever arm 118 is mounted in the passage 116 and arranged to extend through the arcuate slot 20. The valve actuator 110 has a cylindrical outer face 120 which is adapted to fit in a close fitting sliding relationship within the passage 18. The actuator 110 is rotable within the passage 118 by manually engaging the lever arm 118 and moving it angularly along the slot 20. The cylindrical face 120 of the acuator 110 is formed with cam faces 122 and 124. The cam face 122 is arranged to be disposed in alignment with the open upper end of the cylinder 114 and the cam face 134 is arranged to be located in alignment with the open upper end of the cylinder 116.

The contour of the cam face 122 is best illustrated in FIGS. 2 and 3 of the drawings and the contour of the cam face 124 is best illustrated in FIG. 4 of the drawings. The cam face 122 has a circumferentially elongated lead-in portion 126 and a generally flat general portion 128. The cam face 124 is substantially flat and extends sharply from the cylindrical face 120 of the actuator 110. The flat cam face 124 is angularly displaced with respect to the flat portion 128 of the cam face 122 by an angle of about 120 degrees such that when the lever arm 118 is in the position shown in solid lines in FIG. 3, the flat portion 128 of the cam surface 122 is disposed opposite the upper end of the piston 68 and when the lever arm 118 is located in the position shown in broken lines in FIG. 3, the flat cam face 124 is located opposite the upper end of the piston 70.

When the lever arm 118 is in the intermediate position as shown in FIG. 2 of the drawings, each of the pistons 68 and 70 bear against the cylindrical face 120 of the actuator 110 thereby locating both pistons in the depressed position shown in FIG. 2. In the depressed position, the stem 42 of the first vent valve 38 is disposed opposite the portion of reduced diameter 76 of the piston 68 with the result that it is not displaced by the piston 68 and assumes the position in which the flow control valve 38 is closed. The piston 70 is similarily located with the result that the flow control valve 40 is also closed. The second flow control valves 88 and 90 are both open by reason of the engagement of the valve stem 98 by the stops 108. Thus, any air trapped in the outlet passage 66 or downstream thereof may vent through the vent passage 80 and through the open bore end of the cylinders 14 and 16.

To modulate the air flow through the valve by effecting a gradual increase in the passage of air from the inlet passage 24 to the outlet passage 66, the actuator arm 118 is rotated in a clockwise direction with reference to FIG. 2 of the drawings. This causes the lead-in portion 126 of the cam face 122 to progressively move across the end of the piston 68 and this in turn permits the piston 68 to move upwardly in the cylinder 14. The upward movement of the piston 68 causes the portion 78 of the side wall of the piston 68 to bear against the valve stem 42 and continued upward movement progressively deflects the valve stem 42 to progressively open the flow control valve 38. Upward movement of the piston 68 also displaces the lower end of the piston 68 with respect to the stop 108 such that the second flow control valve 88 progressively closes. The second flow control valve 88 is fully closed before the first flow control valve 38 is fully open. In this manner, the air supplied to the outlet passage 66 is modulated to progressively increases.

By rotating the lever arm 118 in a counter-clockwise direction from the position shown in FIG. 2, the cam face 124 will very suddenly be presented to the upper end of the piston 70 thereby causing a very rapid closing of the second flow control valve 90 and a very rapid opening of the first flow control valve 40.

It will be apparent that the first flow control valves 38 and 40 and second flow control valves 88 and 90 may be removed for servicing and cleaning with ease merely by removing their associated pistons 68 and 70 and mounting sleeves 30 and 32. The flow control valves 38, 40, 88 and 90 are very inexpensive valve mechanisms which have been tested for effectiveness over very long time periods and are recognized to be very reliable pneumatic valves. The use of these simple and inexpensive flow control valves in the pneumatic valve of the present invention greatly reduces the overall cost of manufacturing the pneumatic valve.

Various additional modifications of the pneumatic valve of the present invention will be apparent to those skilled in the art. While the embodiments illustrated in FIG. 1 illustrate two cylinders arranged in a side-by-side relationship, it will be apparent that a single cylinder valve or a multi-cylinder valve may be provided.

These and other advantages of the structure of the present invention will be apparent to those skilled in the art.

I claim:

1. A pneumatic valve comprising:

(a) a housing having a cylinder formed therein,
(b) a valve actuator for opening and closing the valve, said valve actuator comprising a slide member slidably mounted in said cylinder for movement in a path which extends longitudinally of the cylinder between a first position and a second position,
(c) an air inlet passage opening into said cylinder,
(d) an air outlet passage opening from said cylinder,
(e) a vent passage opening from said cylinder,
(f) a first flow control valve in said inlet passage which is operable to close to prevent and open to permit the passage of air from the inlet passage to the cylinder,
(g) a second flow control valve in said vent passage which is operable to close to prevent and open to permit the passage of air from said cylinder to said vent passage thereby to vent said outlet passage,
(h) said slide member being adapted to locate the first flow control valve in its closed position and the second flow control valve in its open position when in said first position and to locate said first flow control valve in its open position and said second flow control valve in its closed position when in said second position,
(i) said first and second flow control valves each having a valve stem slidably mounted thereon which is movable between a first position closing and a second position opening said flow control valve, and means normally urging said stem to said first position, the valve stem of the second flow control valve being arranged to project into said cylinder in the direction of movement of said slide member and wherein stop means is supported by said housing in said path of travel of the slide member for arresting movement of the valve stem as said slide member moves toward said first position while permitting continued movement of the slide member to its first position to fully open said second flow control valve as aforesaid.

2. A pneumatic valve comprising:
(a) a housing having a cylinder formed therein,
(b) a valve actuator for opening and closing the valve, said valve actuator comprising a slide member slidably mounted in said cylinder for movement, in a path which extends longitudinally of the cylinder, between a first position and a second position, a portion of the length of said slide member having a portion reduced cross-sectional area which cooperates with the cylinder to form an air receiving chamber within said cylinder,
(c) an air inlet passage opening through said housing into said air receiving chamber, said inlet passage having an upstream end for communicating with an air pressure source and a downstream end communicating with said cylinder to admit air to said chamber,
(d) an air outlet passage opening through said housing from said chamber, said outlet passage having an upstream end communicating with said chamber and a downstream end opening from said housing,
(e) a vent passage opening from said chamber through said slide member, said vent passage having an upstream end communicating with said cylinder to permit the discharge of air from said chamber and a downstream end opening from said housing, (f) a first one-way check valve in said inlet passage, said first one-way check valve having a valve member arranged to check the flow of air from the upstream end to the downstream end of said inlet passage, said valve member being movable in the upstream direction to open to permit the passage of air from the inlet passage to said chamber and being spring loaded for movement in the downstream direction to close to prevent the passage of air from the inlet passage to said chamber, said first check valve having a valve stem projecting from its valve member in said downstream direction, and from the downstream end of said air inlet passage into said chamber, (g) a second one-way check valve in said vent passage of said slide member, said second one-way check valve having a valve member arranged to check the flow of air from the upstream end to the downstream end of said vent passage, said valve member being movable in the upstream direction to open to permit the venting of air from said chamber and being spring loaded for movement in the downstream direction to close to prevent the venting of air from said chamber, said second check valve having a valve stem projecting from its valve member in said downstream direction, and from the downstream end of said vent passage, (h) said slide member being adapted to locate the first one-way check valve in its closed position and the second one-way check valve in its open position when in said first position and to locate said first one-way check valve in its open position and said second one-way check valve in its closed position when in said second position.

3. A pneumatic valve as claimed in claim 2 wherein said first and second flow control valves each have a valve stem slidably mounted thereon which is movable between a first position closing and a second position opening said flow control valve, and means normally urging said stem to said first position.

4. A pneumatic valve as claimed in claim 3 wherein said first and second flow control valves are each Schrader valves.

5. A pneumatic valve as claimed in claim 3 wherein the valve stem of the first flow control valve is arranged to project into said cylinder transversely of the path of travel of the slide member so as to be engaged by the slide member as it moves between its first and second position thereby to locate the first control valve in its closed and opened positions as aforesaid.

6. A pneumatic valve as claimed in claim 3 wherein the valve stem of the second flow control valve is arranged to project into said cylinder in the direction of movement of said slide member and wherein stop means is supported by said housing in said path of travel for arresting movement of the valve stem as said slide member moves toward said first position while permitting continued movement of the slide member to its first position to fully open said second flow control valve as aforesaid.

7. A pneumatic valve comprising:
(a) a housing having a cylinder formed therein,
(b) a valve actuator for opening and closing the valve, said valve actuator comprising a slide member slidably mounted in said cylinder for movement, in a path which extends longitudinally of the cylinder, between a first position and a second position, a portion of the length of said slide member having a reduced cross-sectional area forming an air receiving chamber within said cylinder, (c) an air inlet passage opening through said housing into said air receiving chamber, said inlet passage having an upstream end for communicating with an air pressure source and a downstream end communicating with said cylinder to admit air to said chamber, (d) an air outlet passage opening through said housing from said air receiving chamber, said outlet passage having an upstream end communicating with said cylinder to permit the discharge of air from said chamber and a downstream end opening from said housing, (e) a vent passage opening from said chamber through said slide member, said vent passage having an upstream end communicating with said chamber and a downstream end opening from said housing, (f) a first one-way check valve in said inlet passage, said first one-way check valve having a valve member arranged to check the flow of air from the upstream end to the downstream end of said inlet passage, said valve member being movable in the upstream direction to open to permit the passage of air from the inlet passage to said chamber and being spring loaded for movement in the downstream direction to close to prevent the passage of air from the inlet passage to said chamber, said first check valve having a valve stem projecting from its valve member in said downstream direction, and from the downstream end of said air inlet passage into said air receiving chamber, (g) a second one-way check valve in said vent passage of said slide member, said second one-way check valve having a valve member arranged to check the flow of air from the upstream end to the downstream end of said vent passage, said valve member being movable in the upstream direction to open to permit the venting of air from said chamber and being spring loaded for movement in the downstream direction to close to prevent the venting of air from said chamber, said second check valve having a valve stem projecting from its valve member in said downstream direction, and from the downstream end of said vent passage, (h) said slide member being adapted to locate the first one-way check valve in its closed position and the second one-way check valve in its open position when in said first position and to locate said first one-way check valve in its open position and said second one-way check valve in its closed position when in said second position, and (i) stop means supported by said housing in said path of travel of the slide member for arresting movement of the valve stem of said second one-way check valve as said slide member moves toward said first position while permitting continued movement of the slide member to its first position to fully open said second one-way check valve as aforesaid.

* * * * *